United States Patent [19]

Zoller

[11] 4,013,220
[45] Mar. 22, 1977

[54] BACK-PRESSURE-RESISTANT VAPOR TRAP FOR CONDENSATE DISCHARGE

[75] Inventor: Raimund Zoller, Oberwil, Switzerland

[73] Assignee: KERAG Kessel-,Apparate- und Anlagenbau Richterswil/Switzerland, Richterswil, Switzerland

[22] Filed: July 7, 1975

[21] Appl. No.: 593,289

[30] Foreign Application Priority Data

July 9, 1974 Germany .......................... 2432964

[52] U.S. Cl. ................................ 236/56; 137/183; 236/99 R
[51] Int. Cl.² .......................................... F16T 1/04
[58] Field of Search ............... 137/525, 525.3, 496, 137/183; 251/61.1; 236/56, 58, 93 A, 99 R, 99 J

[56] References Cited

UNITED STATES PATENTS

| 208,520 | 10/1878 | Hawes | 236/56 |
|---|---|---|---|
| 1,220,985 | 3/1917 | Harter | 251/61.1 X |
| 3,083,943 | 4/1963 | Stewart et al. | 251/61.1 |
| 3,386,468 | 6/1969 | Dickinson et al. | 137/496 |
| 3,531,079 | 9/1970 | Greene | 251/61.1 |

FOREIGN PATENTS OR APPLICATIONS 965,947  2/1950  France .............................. 137/525

*Primary Examiner*—Harold W. Weakley
*Attorney, Agent, or Firm*—William R. Woodward

[57] ABSTRACT

In addition to a deformable disk membrane with a valve seat on a portion of a flange immediately surrounding a discharge opening, there is provided a similarly deformable annular disk membrane on a valve seat surrounding that of the disk membrane set back into the flange surface by at least the thickness of the annular disk membrane somewhat obliquely to form a wedge-shaped flow channel communicating with the inlet opening for the working medium. The two membranes are clamped together at their outer edges with an O-ring and a cap providing the chamber for the control medium. The annular membrane operates as a built-in check valve when back pressure of the condensate pushes the disk membrane off its seat, the annular membrane remaining on its seat and blocking the inlet opening against backflow.

4 Claims, 1 Drawing Figure

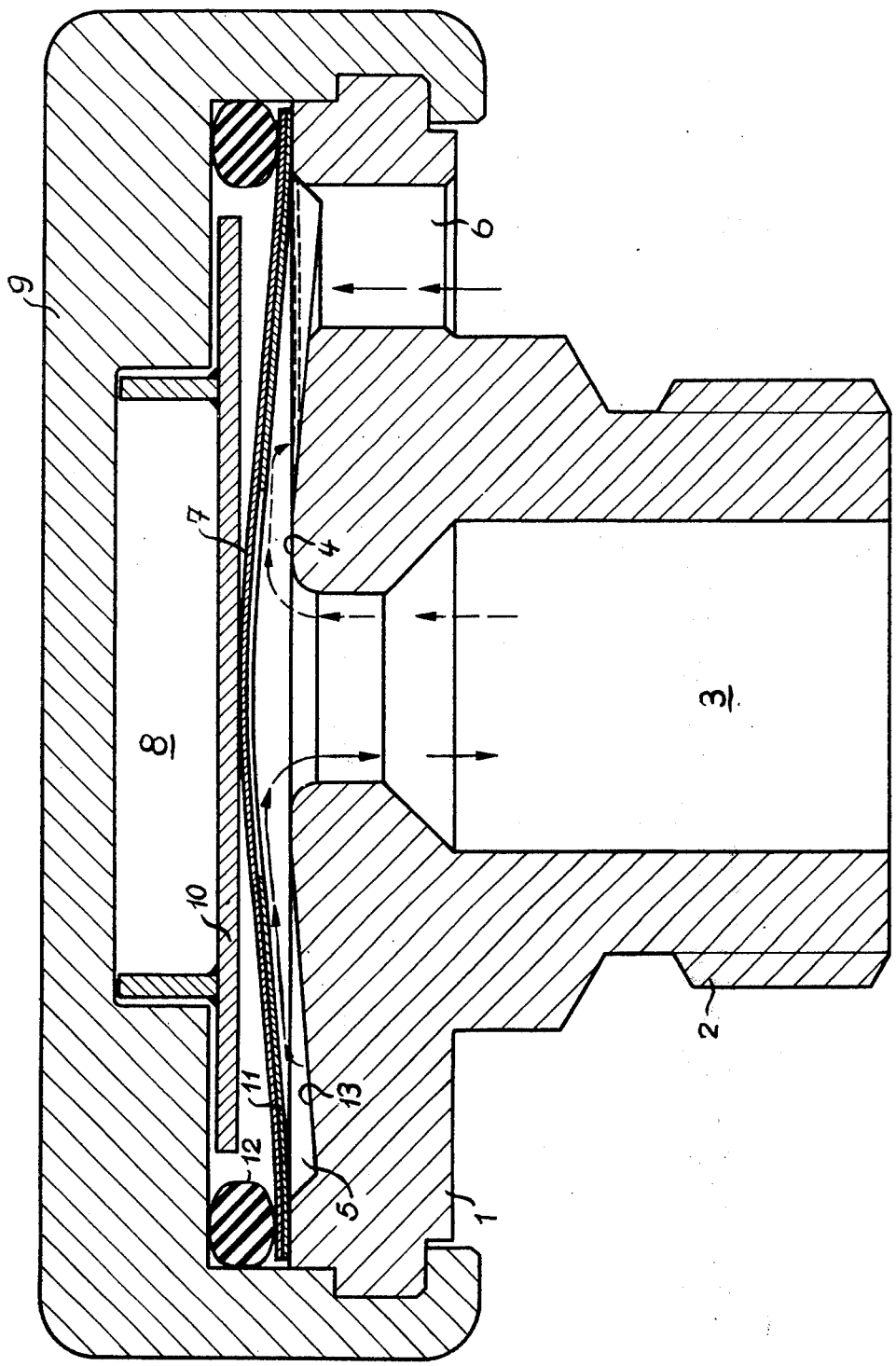

BACK-PRESSURE-RESISTANT VAPOR TRAP FOR CONDENSATE DISCHARGE

This invention relates to a vapor trap of the kind commonly known as a steam trap because of its use in water vapor systems, and more particularly a vapor trap having a discharge valve comprising a valve seat provided by the edge of a discharge opening and a movable valve member in the form of a membrane that is adjacent to the valve seat and is subjected to the effect of a temperature-dependent control medium to operate against the pressure of a working medium entering through an inlet opening provided in or adjacent to the valve seat. In steam traps and other vapor traps for the discharge of a condensate in a vapor-liquid system, a problem has always been presented of preventing a backflow of the working medium into the vapor-using chamber in consequence of the development of a back pressure, either through re-evaporation or through a pressure rise to be overcome, and for this reason an additional and separate check valve has heretofore been interposed in the flow circuit of the vapor trap.

It is an object of the present invention to provide a vapor trap of the above-mentioned type which is capable of preventing such reverse flow without requiring the provision of a separate check valve.

SUBJECT MATTER OF THE PRESENT INVENTION

Briefly, in the flow path of the working medium between an inlet opening and the discharge opening a check valve element is provided in the form of an annular membrane. More particularly, the check valve annular membrane is arranged to lie at least partly against the closure side of the movable discharge valve member which is likewise in the form of a membrane, and both membranes are clamped in position together in their peripheral regions. It is particularly helpful in such a case to provide the valve seat for the check valve membrane by a setback running around the valve seat for the discharge valve membrane, set back from the latter by at least the thickness of the check valve membrane.

Furthermore, it is particularly advantageous to provide that in the region where the membranes are clamped in position, the pliability of the check valve membrane is greater than that of the discharge valve membrane, while in the valve seat region the pliability of the check valve membrane is smaller than that of the discharge valve membrane.

By such provisions, it has been found possible to make the vapor trap itself effective as a check valve in response to a development of a back pressure, in an arrangement in which the only additional component is practically limited to the building in of a second membrane, which in comparison with the heretofore known combinations of vapor traps and check valves leads to a substantial saving in cost and to lower space requirements also. In such an arrangement, the check valve membrane does not interfere in any way with the discharge passing function of the discharge valve membrane, whereas on the other hand, the check valve membrane can fulfill its closure function in response to the development of a back pressure without interference from the discharge valve membrane.

The invention is further described by way of illustrative example by reference to the annexed drawing, in which the single FIGURE shows a diagrammatic cross-section of a vapor trap in accordance with the invention, the cross-section being in a plane which passes through the axis of the discharge opening.

The vapor trap shown in the drawing shows a flange 1 on a threaded pipe 2 by which the vapor trap, which functions as a condensate drain may be screwed into the casing (not shown) of an apparatus into which the liquid working medium flows, the hollow interior of the pipe 2 serving as a discharge opening 3. The working medium is a vaporizable liquid, usually water utilized in a water-steam cycle of some kind and the reference to it as a working medium signifies not only that other vaporizable liquids may be used, but also that, according to the temperature and pressure, both the vapor phase and the liquid phase may be present at once, or only the vapor phase, or only the liquid phase.

The valve seat of the discharge valve of the vapor trap is formed by the surrounding edge or border surface 4 on the flange side of the discharge opening 3, around which, as more particularly described below, there is an encircling annular depression or channel 5 on the end surface of the flange 1 which connects with an inlet opening 6 provided in the flange 1 for flow of the working medium from the inlet opening into the annular channel 5 and controllably into the discharge opening 3.

A membrane 7 cooperates in a known manner with the valve seat surface 4 as a movable valve member that is held adjacent to the valve seat 4 against the pressure of the working medium entering through the inlet opening 6 under the effect of a temperature-dependent control medium, as more particularly described below. It should be noted here that the membrane 7 is illustrated in the drawing in the position in which the discharge valve is open.

The control medium is also a vaporizable liquid exerting a pressure dependent upon the temperature and it is located in a known manner in a cavity 8 enclosed by the inner circumferential walls and the end surface of a cap 9 mounted on the flange 1, on the one hand, and on the other hand, is closed off by the outer surface of the membrane 7. In this cavity there is also located a stop plate 10 for the membrane 7 that prevents an excessive bending out of this membrane 7 in its open position.

The control medium may be formic acid, or water, or in any case a medium that has a vapor pressure characteristic at least approximately proportional to that of water when water is the working medium. The liquid phase of the control medium fills the enclosed space 8 only partly, so that enough space remains so that the control medium can pass into its saturated vapor condition when it is warmed up, as is also well known.

Whereas the membrane 7 forms a discharge valve between the inlet opening 6 and the discharge opening 3 in cooperation with the valve seat surface 4, there is also provided in the flow path for the working medium provided by these openings 6 and 3 and the annular channel 5, a check valve that has a membrane 11 in a flat almost disk-like annular shape as the movable member. This check valve membrane 11 lies, as can readily be seen in the drawing, against the closure side of the discharge valve membrane 7 in its open position, and both the membranes 11 and 7 are together clamped between the flange 1 and the cap 9 in the region of their outer edges with the interposition of a O-ring 12. The O-ring 12 is made of an elastic material and performs, in addition to its support function, the function of providing a gas-tight closure between the cavity 8 and the annular channel 5.

The check valve membrane 11 cooperates with a valve seat surface 13 formed by a portion of the oblique (shallowly conical) boundary surface of the annular channel 5 that is formed by the shaping of the annular channel 5 as running outward in wedge-shaped (radial) cross-section with respect to the valve seat surface 4 of the discharge valve membrane 7. In the drawing, the closed position of the check valve membrane 11 is indicated by dashed lines. The drawing makes clear that the valve seat surface 13 must be set back with respect to the valve seat surface 4, at least by the thickness of the check valve membrane 11 which it accommodates, in order that the discharge valve membrane 7 may close against the valve seat surface 4 without hindrance.

In order to provide a more reliable operation, as set forth in more detail below, the construction of the vapor trap shown in the drawing should be so constituted that in the clamping region of the membranes, the pliability of the check valve membrane 11 is greater than that of the discharge valve membrane 7, while in their valve seat region of the membrane the pliability of the check valve membrane 11 should be less than that of the discharge valve membrane 7. This can be provided by thickness variations (with radius) of one or the other membrane, or of both. In the illustrated case, this result is obtained by soft or yielding clamping of the two membranes by the above-mentioned O-ring 12.

In operation of the vapor trap illustrated in the drawing, particularly as a condensate drain, the pressure on the control side of the discharge valve membrane 7 will fall as usual when there is condensation of the working medium as the result of the temperature drop related to that condition. According to the vapor pressure characteristic of the control medium, even a temperature drop of a few degrees provides a sufficient pressure drop to allow the membranes 7 and 11 to move away at least a little from their respective valve seats 4 and 13. Since as already explained the check valve membrane 11 is more yielding in its edge region than the discharge valve membrane 7, these two membranes 7 and 11 can be regarded as a unit with reference to the opening operation of the discharge valve. Both membranes, accordingly, move away from the valve seats together, as the result of which the condensate or the condensate-vapor mixture (of the working medium) can flow out along the path indicated by the solid arrows in the drawing, as the result of which flow the pressure produced by the working medium is at once spread over the entire discharge side surface of the membranes 11 and 7 and this pressure increase produces a practically snap-like full opening of the discharge opening 3, to the position shown in the drawing.

When the working medium in the vapor trap appears again in its vapor condition, the temperature rise related to that situation produces a pressure rise in the thermostat chamber 8, as the result of which both membranes 7 and 11 together return back into their closure condition.

If, however, a back pressure develops and causes a backflow indicated by the arrows shown in the drawing by dashed lines, this pressure impinges immediately on the inner portion of the membrane 7 lying on the valve seat surface 4, as the result of which the membrane 7 can move away from its valve seat. Since in this location, as already explained, the middle region of the membrane 7 is more yielding than the inner edge region of the membrane 11, the latter remains lying against its valve seat surface 13, in the manner indicated by dashed lines over the inlet opening 6. In consequence, there is formed a narrow annular gap or crevice between the discharge valve membrane 7 that is opening and the persistently unmoved check valve membrane 11, as the result of which the back pressure is distributed between the two erstwhile adjacent membranes 7 and 11 and, on the one hand, pushes off the membrane 7 further while, on the other hand, it also presses the check valve membrane 11 firmly on its valve seat 13, thus assuring the prevention of a backflow. If then the back pressure is reduced back down to normal levels, the discharge valve membrane 7 also returns back to its valve seat 4.

Although the invention has been described with respect to a particular illustrative example, it will be understood that variations are possible within the inventive concept.

I claim:
1. A vapor trap for release of condensate comprising:
   a valve seat provided around the edge of a discharge opening;
   a movable discharge valve member in the form of a first membrane adjacent to said valve seat and arranged to be moved by the effect of a temperature-dependent vaporizable liquid control medium against the pressure of a vaporizable liquid working medium entering through an entrance opening provided in said valve seat, and
   a movable ring-shaped second membrane (11) in the flow path of said working medium between said entrance opening and said discharge opening for preventing backflow, lying against the closure side of said first membrane (7) and peripherally clamped in common with said first membrane,
   said valve seat being encircled by an obliquely profiled annular set back further valve seat surface (13) which is set back at the deepest part of its setback profile by at least the thickness of said second membrane (11), and
   the pliability of said second membrane (11) being greater than that of said first membrane (7) in the region where said membranes are peripherally clamped and being smaller than that of said second membrane (7) in the region of said valve seat (4).
2. A vapor trap as defined in claim 1, including an O-ring (12) providing a gas-tight seal where said membranes are clamped in position.
3. A vapor trap as defined in claim 1, in which said further valve seat surface (13) is a portion of the boundary of an annular channel (5) in flow-permitting connection with said entrance opening (6).
4. A vapor trap as defined in claim 3, in which said annular channel (5) is of wedge-shaped cross-section and is faired out into said valve seat (4) and a portion of the so provided oblique surface provides the valve seating surface (13) for said second membrane (11).

* * * * *